Feb. 2, 1943.  R. W. ROSS  2,309,790
INTEGRATING APPARATUS.
Filed March 12, 1942  2 Sheets-Sheet 2
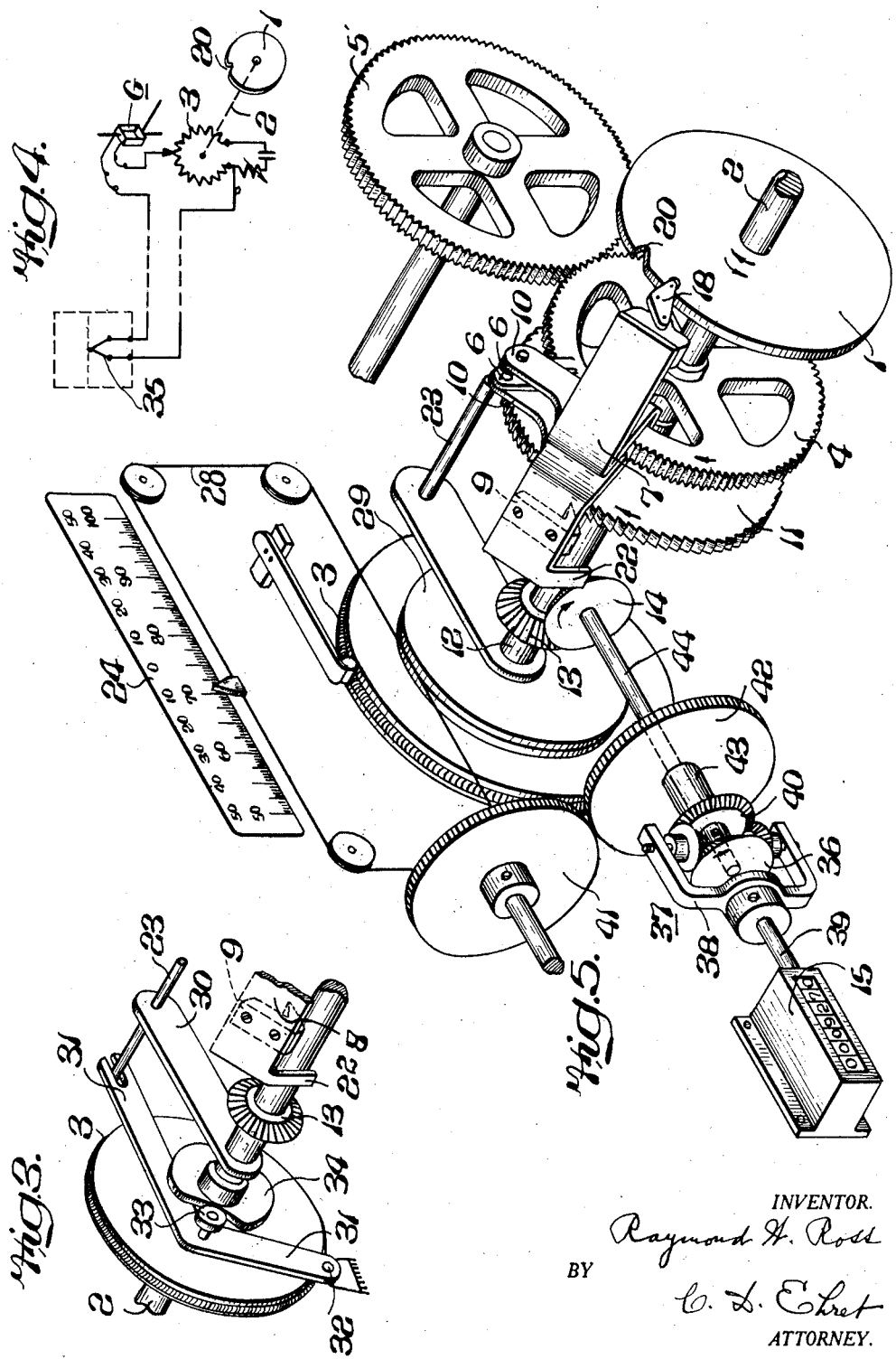
INVENTOR.
Raymond W. Ross
BY
C. L. Ehret
ATTORNEY.

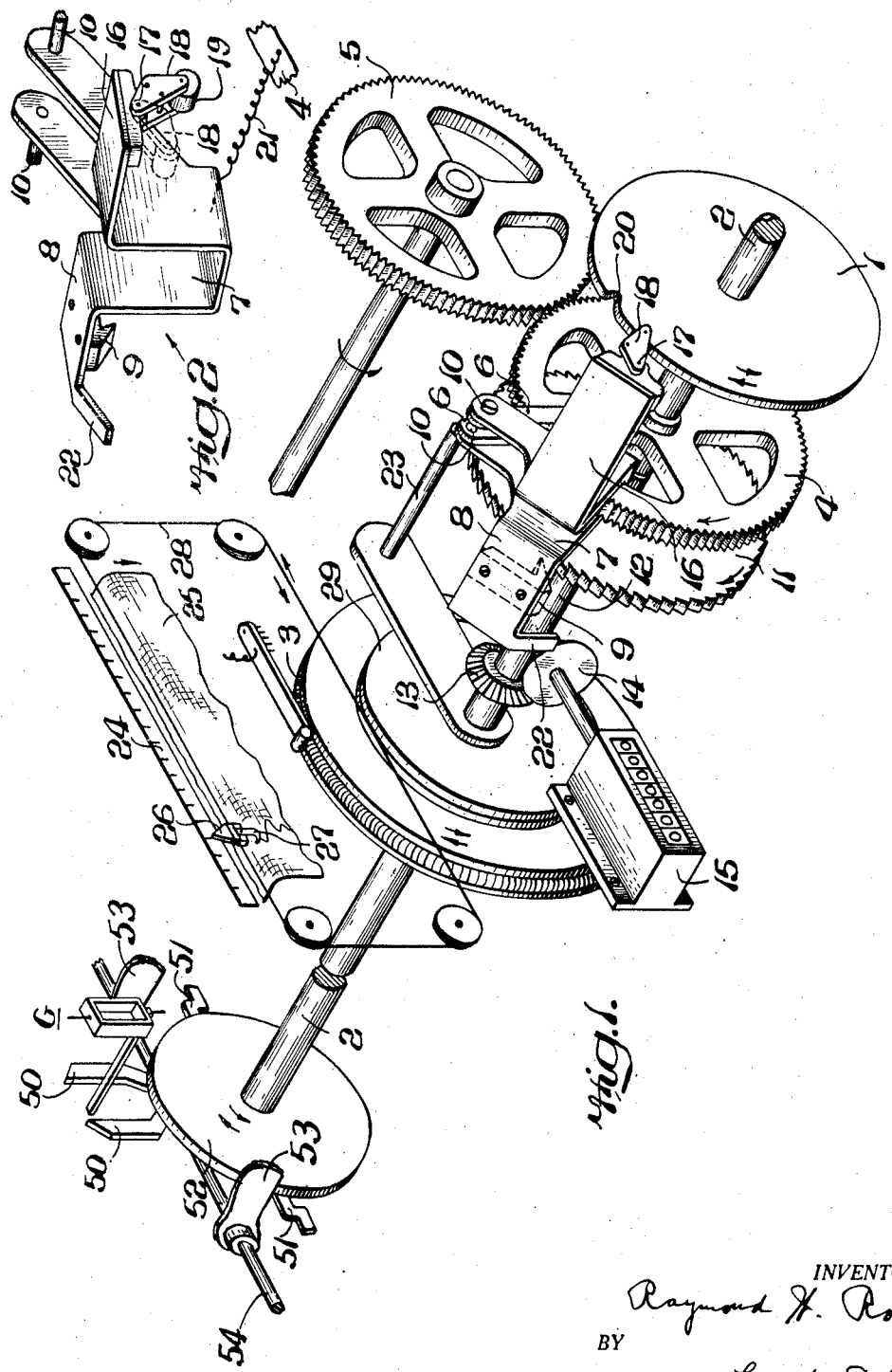

Patented Feb. 2, 1943

2,309,790

UNITED STATES PATENT OFFICE 2,309,790

INTEGRATING APPARATUS

Raymond W. Ross, Philadelphia, Pa., assignor to Leeds and Northrup Company, Philadelphia, Pa., a corporation of Pennsylvania Application March 12, 1942, Serial No. 434,351

3 Claims. (Cl. 235—61)

My invention relates to apparatus for integrating with respect to time the magnitudes of a quantity or condition, for example the rates of flow of a fluid or comminuted solid, magnitudes of electric current, voltage, or power, or the magnitudes of departure from standard of the frequency of alternating current or tie line load.

In accordance with my invention, the driving means of an integrating or counting device comprises or consists of mechanism intermittently or periodically effective for periods of time each of duration determined by structure positioned in accordance with the magnitudes of the condition to be integrated; more particularly, the driving means comprises a ratchet, or equivalent, and a pawl, or equivalent, rotatable with respect to each other and whose relative movements into and out of engagement with each other during each revolution are controlled by aforesaid structure and by a member whose position is at least nominally fixed but which may in certain cases, as when the position of said structure is not a linear function of the magnitude of the condition, be varied in compensation for the non-linearity.

Further in accordance with some forms of my invention, the aforesaid driving means may include a differential mechanism one of whose components is intermittently or periodically moved by aforesaid ratchet and pawl mechanism, or equivalent, and another of whose components is driven either in such direction and at such average rate that the integration is that of variations in magnitude above and below a predetermined magnitude of the condition, or in such direction and at such average rate that the integration is that of variations in magnitude above or below a predetermined magnitude.

My invention further resides in the features of construction, combination and arrangement described and claimed.

For an understanding of my invention and for illustration of various modifications thereof, reference is made to the accompanying drawings, in which:

Fig. 1, in perspective, illustrates an integrating mechanism and associated elements of a recording or indicating device;

Fig. 2 is a detail view of one of the elements of the integrating mechanism of Fig. 1;

Fig. 3, in perspective, illustrates a modification of parts appearing in Fig. 1;

Fig. 4 diagrammatically illustrates a measuring system including parts shown in Fig. 1;

Fig. 5, in perspective, discloses a modification of apparatus shown in Fig. 1.

Referring to Fig. 1, the notched disc 1 is adjusted so that its angular positions correspond with the instantaneous magnitudes of a condition under measurement. In the particular arrangement of Fig. 1, disc 1 is attached to the same shaft, 2, as slidewire 3, which latter may be adjusted, as by a mechanical relay of type disclosed in Letters Patent 1,935,732 to Squibb or by an electrical relay system of type disclosed in Letters Patent 2,113,164 to Williams, concurrently to rebalance an electrical network including slidewire 3 and correspondingly to position disc 1.

The mechanical relay mechanism disclosed in Fig. 1 includes galvanometer G, feelers 50, driving clutch member 51, driven clutch member 52, and cams 53 attached to the constant speed shaft 54; for description of operation of these elements reference is made to aforesaid Squibb patent.

The gear 4, free to rotate upon shaft 2 is driven continuously or intermittently at constant average speed as by gear 5 either connected directly to a suitable source of power, such as a synchronous motor or one equipped with a suitable speed governor, or to such source of power through a Geneva motion or equivalent; in the particular arrangement shown in Fig. 1, gear 5 rotates at the same speed as and is driven from shaft 54. From the opposite sides of gear 4 extend the arms 6 for pivotally supporting the frame member 7 which extends through and straddles the rim of gear 4 to leave the periphery thereof unobstructed for engagement by gear 5. To extension 8 of member 7 is attached the pawl 9, or equivalent disengageable driving element, suited, when member 7 is swung in counter-clockwise direction about its pivots 10, to engage ratchet 11, or equivalent driven element, suitably fastened to sleeve 12 free to rotate upon shaft 2 which passes through it. Gear 13, attached to sleeve 12, is in mesh with gear 14 coupled more or less directly to revolution-counting device 15 or equivalent totalizing mechanism.

To extension 16 of the frame member 7 is pivotally attached at 17 a cam follower 18 (in construction similar to member 64 of my application Serial No. 343,761 upon which issued Letters Patent No. 2,279,528) which is biased by a spring, not shown, to the full line position shown in Fig. 2.

When, during a revolution of frame member 7 about the axis of shaft 2, the roller 19 of cam follower 18 rides into and across the notch 20 of disc 1, the follower 18 is swung in clockwise direction about its pivot 17 (to dotted line position Fig. 2) whereupon spring 21 connected between member 7 and gear 4 is effective to rock member 7 in counterclockwise direction about its pivot, or toward the axis of shaft 2, so to effect engagement of pawl 9 with ratchet 11. This driving connection so effected between the gear 4 and ratchet 11 is maintained until, subsequently in the same revolution, the under face of inclined extension 22 of member 7 engages and rides along the relatively fixed abutment or pin 23, whereupon member 7 is rocked in clockwise direction about its pivot 10 to move pawl 9 away from engagement with ratchet 11. Cam follower 18 is thereupon returned to it original position (to full line position, Fig. 2) by its biasing spring and so holds pawl 9 away from engagement with ratchet 11 until cam follower 18, in the next revolution of gear 4, again rides into notch 20 of disc 1.

Thus in every revolution of gear 4, a driving connection between it and the totalizer 15 is effected for a fraction of revolution, or an angular magnitude, or number of degrees, which is determined by the relative positions of notch 20 and abutment 23; the greater the angle from notch 20 to abutment 23, as measured in the direction of rotation of gear 4, the larger the percentage of a revolution for which the pawl and ratchet, or equivalent disengageable clutch members, remain in engagement.

The ratio of gears 13, 14, or equivalent motion-transmission means, is inversely proportional to the ratio of the angular extent of slidewire 3 to 360°; for example, when the extent of slidewire 3 is 324°, gears 13, 14 should have a 10 to 9 step-up speed ratio in compensation for the disparity between the range of adjustment of the slidewire and the maximum period of engagement, per revolution of gear 4, between pawl 9 and ratchet 11.

For continuous rotation of gear 5, the abutment 23 may be so positioned that disengagement of the pawl 9 from ratchet 11 occurs within the angle corresponding with the 36° gap in the slidewire. Because of the gearing ratio and location of abutment 23, the device will integrate every position of the slidewire and with a 360 tooth ratchet, is in practice accurate to at least ⅓ of one per cent of full scale. When shaft is adjusted by a mechanical relay of the aforesaid Squibb type having cams 53 whose maximum period of engagement with arm 51 is not more than about 90° of a revolution of gear 4, the latter is so phased with respect to the relay mechanism which actuates shaft 2 that disc 1 is not, for any of the positions of slidewire 3 above about 20% of its extent, in motion when pawl 9 is in engagement with ratchet 11 thus to minimize errors which might otherwise arise because of movement of disc 1 while the ratchet is in motion.

For intermittent rotation of gear 5, it is so phased that it is at rest for that portion of the cycle during which a cam 53 may be resetting the slidewire 3 and disc 1.

To record and/or indicate the instantaneous magnitudes of a condition, there may be provided, generally as disclosed in Letters Patent 2,074,118, the scale 24 and chart 25 cooperating respectively with pointer 26 and marker 27 which are coupled, as by cord 28 and drum 29, to shaft 2 and disc 1.

When the relation between the positions of the slidewire and the measured magnitudes of the condition is not a linear one, that is, when for equal increments of change in magnitude of the condition slidewire 3 must be adjusted to unequal extents to restore balance, the positions of the slidewire 3, Figs. 1 or 5, may nevertheless be totalized correctly to integrate the magnitudes of such condition by recourse to the arrangement shown in Fig. 3, or its equivalent.

In this modification, the abutment 23, which determines when in each revolution of gear 4 is lifted the pawl 9 or equivalent driving member, is adjusted for each different magnitude of the condition in sense and to extent compensatory of aforesaid non-linearity; so long as there is no change in magnitude of the measured condition, abutment 23 remains stationary throughout successive cycles of operation of the pawl and ratchet mechanism.

As shown, abutment 23 may be carried by an arm 30, free to pivot about shaft 2, and one end thereof is received by the forked or slotted end of an arm 31 pivoted at 32 to some suitable stationary part of the apparatus and carrying a cam follower 33 which continuously engages the rectifying cam 34 attached to shaft 2. Cam 34 is so positioned and shaped in accordance with the particular law of response of the apparatus to the condition being measured that for equal increments of change in magnitude of the condition, the periods of driving engagement between members 4 and 11 are proportionately varied.

The cam 34 does not affect the positions of the pen or marker 27 and indicator 26 whose chart and scale may be non-linear, and so does not enforce modification of the scale or chart because of the need or desire to integrate.

As exemplary of a system utilizing the invention so modified in compensation for non-linearity, Fig. 4 discloses a measuring system in which slidewire 3 is utilized as a potentiometer whose effective voltage is balanced against the voltage produced by thermocouple 35 measuring temperature by total radiation. The voltage produced by the thermocouple does not vary as a linear function of the observed temperature but in accordance with an exponential law of power higher than unity. The cam 34 properly shaped and positioned compensates for the non-linearity, so that the reading of the integrator 15 properly represents the summation of the magnitudes of the temperature integrated with respect to time.

In the modification shown in Fig. 5, the gear 14 driven intermittently by the pawl and ratchet mechanism (of Figs. 1 to 3) or equivalent, is connected to one of the driving gears 36 of differential 37 whose driven member 38 is connected to shaft 39 of the totalizer 15. The other driving gear 40 of the differential is driven intermittently or continuously at suitable average rate and in suitable direction, as by gear 41 in mesh with gear 42 secured to sleeve 43 to which is secured gear 40. Shaft 44 which connects gears 14 and 36 passes freely through sleeve 43.

When gears 5 and 41 are driven intermittently, their movements should preferably be effected concurrently and the average speed of each should be constant.

When, for example, it is desired to integrate the departure of the magnitudes of a condition, as of frequency of alternating current, from a predetermined magnitude, in which event the zero of scale 24 is intermediate, as midway of, its ends, gear 40 is rotated in direction opposite to that of gear 36 and at one-half the speed, in revolutions per minute, of gear 4. Consequently, when disc 1 is in position corresponding with the desired magnitude of the condition, for each revolution of gear 4, the gear 36 is moved by the pawl and ratchet mechanism 9, 11 to extent equal to the movement of gear 40 and in opposite direction; hence the net resultant movement of shaft 39 of the integrator 15 is nil. When the disc 1 is in position corresponding with supernormal magnitude of the condition, the algebraic sum of the movements of gear 36 and gear 40 is positive, and the net rotation of shaft 39 is in direction increasing the total indicated by counter 15. On the contrary, when disc 1 is in position corresponding with sub-normal magnitude of the condition, the algebraic sum of aforesaid movements of gears 36 and 40 is negative, and the net rotation of shaft 39 is in direction decreasing the total indicated by counter 15.

When, as indicated by the lower or "suppressed zero" scale 24, Fig. 2, neither the "minimum" nor any other position of the slidewire corresponds with zero magnitude of the condition to be integrated, the same mechanism may be used, but the direction of rotation of gear 40 is reversed which, in the particular arrangement disclosed, results in advance of shaft 39 at an average speed for "maximum" position of slidewire 3 or disc 1 which is twice the average speed at which it is advanced when disc 1 is in "minimum" position.

What I claim is:

1. Integrating apparatus comprising a driven member, operating means therefor including a driving member rotatable at constant average speed with respect to said driven member and movable relative to the axis of rotation into and out of driving engagement with said driven member, two relatively adjustable structures alternately cooperating with said driving member to effect its aforesaid movements toward and from said driven member, and means for varying the positions of both said members in response to change in magnitude of a condition.

2. Integrating and indicating apparatus comprising revolution-counting means having a driven member, operating means therefor including a driving member rotatable at constant average speed in one direction relative to said driven member and movable in opposite directions relative to the axis of rotation into and out of engagement with said driven member, indicating means including a non-linear scale and cooperating indicating member, structure for effecting movement of said driving member in one of said opposite directions, actuating means adjusted to unequal extents in response to equal changes in magnitude of a condition for varying the position of said structure and the relative position of said indicating means and scale, and structure for effecting movement of said driving member in the other of said opposite directions adjusted by said actuating means in sense and to extent providing equal changes in the movement of said driven member for equal changes in magnitude of said condition.

3. Integrating apparatus comprising a driven member, a co-axial driving member including a pawl movable in opposite directions to engage with and disengage from said driven member, means for rotating said driving member at constant average speed in one direction, two structures relatively adjustable about the axis of rotation of said members for respectively effecting aforesaid movements of the pawl in opposite directions, and cam means adjusted to like extents in response to change in magnitude of a condition for moving said structures to unlike extents proportionately to change the extent of movement of said driven member per revolution of said driving member.

RAYMOND W. ROSS.